March 20, 1951     C. W. JOHNSTONE     2,545,924
FAST IMPULSE CIRCUITS
Filed April 10, 1950
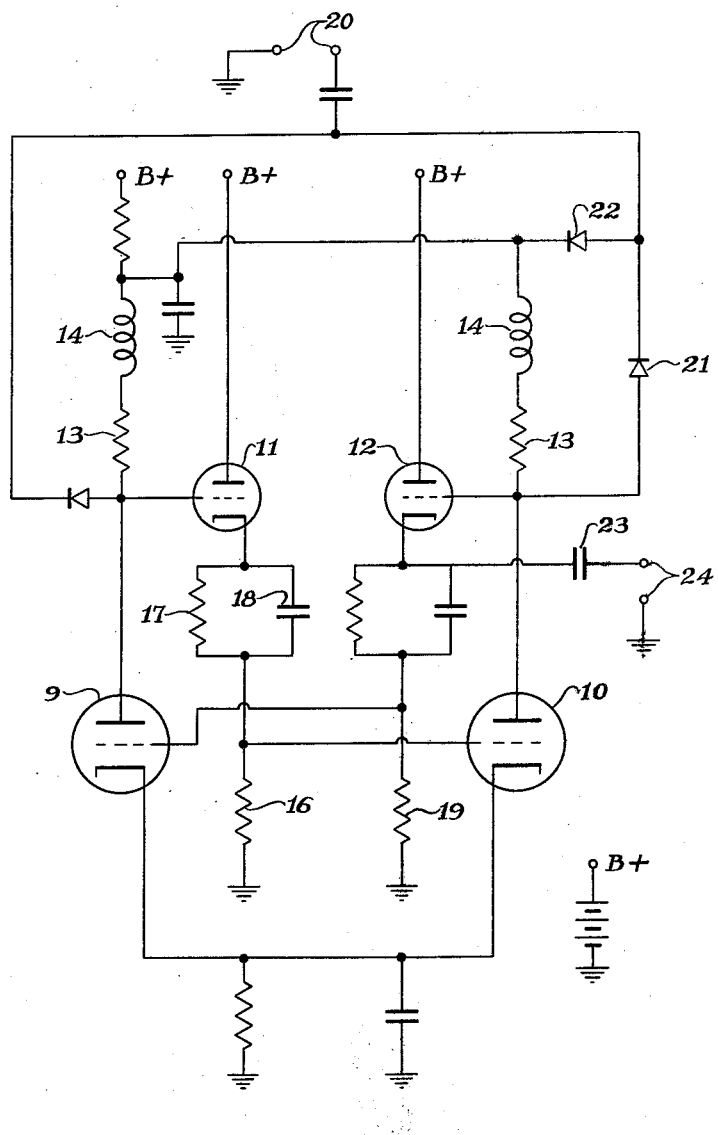
WITNESSES:
INVENTOR:
Charles Wilkin Johnstone Patented Mar. 20, 1951

2,545,924

UNITED STATES PATENT OFFICE 2,545,924

FAST IMPULSE CIRCUITS

Charles Wilkin Johnstone, Los Alamos, N. Mex., assignor to the United States of America as represented by the United States Atomic Energy Commission Application April 10, 1950, Serial No. 155,065

3 Claims. (Cl. 250—27)

This invention relates broadly to impulse responsive circuits and, more particularly, to circuits and apparatus adapted to generate impulses at a fractional rate of the occurrence of observed phenomena.

Circuits of this type are necessary to enable the recording or indicating by mechanical instruments of the occurrence of phenomena in the form of short impulses occurring in rapid succession.

A representative case of such phenomena is the generation of particles by radioactive and nuclear disintegration. The rate of occurrence of such particles may extend into the megacycle per second range.

A major step in measuring the rate of occurrence of observed phenomena is the scaling down of the rate of occurrence into a rate in the order of magnitude within the capabilities of recording or indicating instruments.

The present invention is confined to circuits and apparatus for the accomplishment of the translation of fast occurring electrical impulses into electrical impulses which occur at a fraction of said rate. A device applied to the purpose is subject to rigorous requirements with respect to speed of response and accuracy. The rate of occurrence of electrical impulses impressed on the device may range from a few to as high as 40 megacycles or more per second. The amount of scaling down required may therefore be of extremely high order. It follows that if each stage of the device is inherently capable of scaling down by a factor of two, a large scaling factor requires the inter-coupling of a large number of stages. A single spurious impulse generated by the last stage of $n$ cascaded stages, results in an error of $2^n$ in the count of the phenomena being observed. It also follows that a scaler suitable for such high speed operation must have an extremely short resolving time. By resolving time is meant the interval following the instant of triggering during which the scaler will not respond to a second trigger.

A number of types of scaling down circuits are known in the prior art.

One category of such circuits utilizes gaseous discharge tubes of the thyratron type in a counting circuit known as the Wynn-Williams type and described in "Theory and Application of Electron Tubes" by Reich, 2nd edition, pages 486 and 487, published by the McGraw-Hill Book Company. Impulse frequency dividing circuits of this type are limited in their speed of operation due to deionization time and therefore are restricted in their use to the counting of pulses which occur at a rather low frequency per second.

Another kind of frequency dividing circuit utilizes grid controlled vacuum tubes in trigger circuits generally of the Eccles-Jordan type. The principle of operation underlying the use of the trigger circuit is that two electrical impulses properly impressed on the circuit are required to cycle the circuit once. Therefore, a connection to one of the tubes enables one pulse to be derived for every two imput pulses impressed on the circuit.

Counting circuits utilizing hard vacuum tubes in circuits of the Eccles-Jordan or flip-flop type necessitate the use of an electronic switch for commutating observed input pulses alternately into the trigger tubes. The operation of the electronic switch is preferably automatically synchronized with the tubes in the trigger circuit by means of voltages derived from the trigger circuit. Examples of such circuits are presented by the patent to Michel, No. 2,348,016 and in the article entitled "A 'Scale-of-Two' High Speed Counter Using Hard Vacuum Tubes" by Lewis, written in the Proceedings of the Cambridge Philosophical Society, 1937, volume 33, pages 549 to 558.

It has been found that the circuits of the prior art, although effective for the purposes for which they were designed, are deficient upon application to the accurate counting of impulses occurring at a fast rate.

In accordance with the present invention, an improved circuit for translating the rate of occurrence of electrical impulses into a known fractional rate is accomplished by the addition of cathode followers in the scaler cross-coupling paths.

The trigger circuit of the Eccles-Jordan type is capable of operating at high speeds provided the time constants of the cross-coupling networks are kept small and, in addition, that means be provided for commutating pulses into the circuit without materially lengthening the time constants of the trigger circuit.

A further consideration arises due to the fact that the trigger circuit inherently provides a scaling factor of two. The attainment of scaling factors greater than two requires the coupling together of a plurality of trigger circuits in such manner as to operate in sequence. Such a combination of trigger circuits is capable of operating at high speeds provided the commutating of the input impulses in proper sequence into the respective trigger circuits is accomplished with networks having short time constants, and connected in such manner as not to materially lengthen the response time of the trigger circuits. It has been found that the use of cathode followers in the cross-coupling paths also facilitates the connection of the commutating networks to the scaler circuits without materially lengthening the resolution time of the scaler circuits. The reason for this is that the capacitive load on the scaler anodes is materially reduced making for improved rise time. Even more important, the scaler grids are driven through a low impedance which means that the duration of the characteristic negative overshoot of the grid waveform is greatly reduced.

The advantageous characteristics of the scaler of the present invention over the conventional scaler is apparent from a consideration of the two circuits.

For example, a conventional 6SN7 scale-of-two, using 20,000 ohm anode resistors and whose grids are driven by 200,000 ohm–100,000 ohm resistive dividers with 40 mmf. in shunt with each 200,000 ohm resistor, has a two pulse resolving time of 5 to 7 microseconds, determined almost entirely by the time constant of the anode to grid coupling components.

A cathode follower coupled 6SNR scale-of-two using 10,000 ohm anode resistors and whose grids are driven from the junction of a 20,000 ohm and a 10,000 ohm resistive divider has a two pulse resolving time of 0.4 to 0.5 microsecond. It follows that the cathode follower coupled scaler has a factor of improvement of at least 10 in resolving time over the conventional cross-coupled scaler.

It follows that a prime object of this invention is to provide trigger circuits, particularly of the scale-of-two type, with faster action than has hitherto been obtainable.

Another object is to incorporate cathode follower thermionic devices in the cross-coupling networks of trigger circuits to decrease the resolving time thereof.

With these and incidental objects in view, the invention includes certain novel features of circuits and circuit elements, the essentials of which are hereinafter set forth in appended claims, and a preferred form or embodiment which is hereinafter described with reference to the drawing which accompanies and forms a part of this specification.

Referring to the drawing, the novel structure of this invention is shown applied to a trigger circuit of the scale-of-two type. The circuit comprises two scaler triodes 9 and 10 and two cathode followers 11 and 12, respectively. Each scaler triode anode is loaded by a series connected resistor 13 and inductance 14. Cathode follower triode 11 has its grid coupled to the anode of its respective scaler triode 9. The cathode is provided with a divided load resistor comprising resistors 16 and 17. Capacitor 18 connected in shunt with resistor 17 is for the purpose of coupling high frequency pulse components directly to the grid of the second scaler triode. The scale-of-two thus far described starts with a condition of non-conduction in scaler triode 9 and conduction in scaler triode 10. A negative pulse impressed across the terminals 20 causes a decrease in current through cathode follower 11 with a corresponding decrease in current through cathode follower load resistor 16 and hence, a negative going pulse on the grid of scaler triode 10. The anode current of scaler triode 10 decreases due to the negative pulse on its grid and, accordingly, generates a positive pulse on its anode which is coupled to cathode follower 12. Cathode follower 12 generates a positive pulse across its cathode load resistor 19 which in turn is impressed on the grid of scaler triode 9. The anode current of scaler triode 9 increases thereby generating a negative pulse at its anode and on the grid of cathode follower 11. The effect accumulates with extreme rapidity, transferring conduction from scaler triode 10 back to scaler triode 9.

The second incoming negative pulse is transferred through rectifier 21 to the grid of cathode follower tube 12 thereby initiating the transfer of conduction back to scaler triode 10. Therefore, the scale-of-two comprising scaler triodes 9 and 10 and cathode followers 11 and 12 has completed one cycle for two incoming negative pulses. Rectifier 22 is connected as shown for D. C. voltage restoring purposes. Output terminals 24 are provided to enable the output pulses of the described trigger stage to be impressed on succeeding trigger stages or other apparatus.

It is apparent that trigger circuits incorporating the cathode follower in the manner taught by this invention are not limited to the scale-of-two. While the form of the invention herein shown and described is admirably adapted to accomplish the objects primarily stated, it is to be understood that the invention is susceptible of embodiment in various forms, all coming within the scope of the claims which follow.

What is claimed is:

1. In a trigger circuit generally of the Eccles-Jordan type, comprising first and second grid control vacuum tubes and cross-coupling networks, said cross-coupling networks each including a thermionic tube having at least a cathode, grid and an anode, a connection between the grid of the thermionic tube and the anode of the respective grid controlled vacuum tube, a resistive voltage divider connected to the cathode and in series with the inter-electrode space of the thermionic tube and a connection from said voltage divider to the grid of the other grid controlled vacuum tube.

2. A trigger circuit comprising a first and a second grid controlled electron discharge device each having at least an anode and an anode load resistor, a first and a second cathode follower having at least a grid, a cathode, an anode and a resistive voltage divider connected to the cathode and in series with a source of anode potential and the cathode follower inter-electrode space, means connecting the grid of the first cathode follower to the junction of the first discharge device anode and the anode load resistor, means connecting the junction of the resistive voltage divider of the first cathode follower to the grid of the second grid controlled electron discharge device, means connecting in like fashion the second cathode follower to the anode of the second electron discharge device and the grid of the first electron discharge device.

3. In an electronic switching circuit, a first and a second vacuum tube each having at least an anode, a cathode and a control electrode, a source of anode potential and an impedance connected between the positive pole of the said anode potential source and each of the anodes of the said first and second vacuum tubes, a first and a second cathode follower each having at least a cathode, a grid, an anode and a load resistance in series with the cathode, a connection between the grid of the first cathode follower and the anode of the first electron vacuum tube, a connection from the cathode follower load resistance to the grid of the second vacuum tube, a connection between the anode of the second vacuum tube and the grid of the second cathode follower, a connection between the second cathode follower load resistance and the grid of the first electron vacuum tube, and means for impressing the potential of the anode potential source across each series network comprising a cathode follower inter-electrode space and the respective cathode follower load resistance.

CHARLES WILKIN JOHNSTONE.

REFERENCES CITED

The following references are of record in the file of this patent:

UNITED STATES PATENTS

| Number | Name | Date |
| --- | --- | --- |
| 2,301,928 | Brown | Nov. 17, 1942 |
| 2,416,292 | Dodington | Feb. 25, 1947 |
| 2,418,826 | Engstrom | Apr. 15, 1947 |
| 2,441,579 | Kenyon | May 18, 1948 |
| 2,454,815 | Levy | Nov. 30, 1948 |
| 2,506,439 | Bergfors | May 2, 1950 |